(12) United States Patent
Bibo et al.

(10) Patent No.: US 8,979,118 B2
(45) Date of Patent: Mar. 17, 2015

(54) INFLATOR FASTENING

(71) Applicant: TRW Airbag Systems GmbH, Aschau am Innl (DE)

(72) Inventors: Christian Bibo, Kraiburg (DE); Michael Beyer, Polling (DE); Karl Englbrecht, Erharting (DE); Anton Greissl, Gars am Inn (DE); Christian Grundl, Ampfing (DE); Thomas Kapfelsperger, Muhldorf (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 0 days.

(21) Appl. No.: 14/034,614

(22) Filed: Sep. 24, 2013

(65) Prior Publication Data

US 2014/0103623 A1    Apr. 17, 2014

(30) Foreign Application Priority Data

Oct. 12, 2012  (DE) .......................... 10 2012 019 872

(51) Int. Cl.
*B60R 21/16* (2006.01)
*B60R 21/26* (2011.01)
*B60R 21/217* (2011.01)

(52) U.S. Cl.
CPC ............. *B60R 21/26* (2013.01); *B60R 21/2171* (2013.01)
USPC ........................ 280/728.2; 280/740; 280/741

(58) Field of Classification Search
USPC ............................. 280/728.1, 728.2, 740, 741
See application file for complete search history.

(56) References Cited

U.S. PATENT DOCUMENTS

| 4,153,273 | A | * | 5/1979 | Risko | ............................ 280/740 |
| 4,944,527 | A | * | 7/1990 | Bishop et al. | ................. 280/741 |
| 5,542,701 | A | * | 8/1996 | Rion | ............................ 280/735 |
| 5,613,704 | A | * | 3/1997 | White et al. | .................. 280/740 |
| 5,639,112 | A | * | 6/1997 | Phillion et al. | ............. 280/728.2 |
| 5,806,882 | A | * | 9/1998 | Stein et al. | ................ 280/730.2 |
| 5,836,607 | A | * | 11/1998 | Wallner | .................... 280/728.2 |
| 5,918,898 | A | * | 7/1999 | Wallner et al. | ............. 280/728.2 |
| 5,992,878 | A | * | 11/1999 | Narita et al. | ................ 280/730.2 |
| 6,176,511 | B1 | | 1/2001 | Adkisson et al. | |
| 6,976,700 | B2 | * | 12/2005 | McCann et al. | ........... 280/728.2 |
| 7,325,823 | B2 | * | 2/2008 | Dannenhauer et al. | ..... 280/728.2 |
| 7,419,183 | B2 | * | 9/2008 | Tokuda et al. | ................ 280/737 |
| 7,631,888 | B2 | * | 12/2009 | Seidl et al. | ................ 280/728.2 |
| 7,938,436 | B2 | * | 5/2011 | Lunt et al. | .................. 280/728.2 |
| 8,556,290 | B2 | * | 10/2013 | Fischer | ..................... 280/728.2 |
| 2006/0097490 | A1 | | 5/2006 | Seidl et al. | |

FOREIGN PATENT DOCUMENTS

| DE | 202 20 428 | 8/2003 |
| DE | 103 55 533 | 7/2005 |
| DE | 10 2009 012 364 | 9/2010 |
| DE | 10 2009 039 146 | 3/2011 |

(Continued)

*Primary Examiner* — Toan To
(74) *Attorney, Agent, or Firm* — Tarolli, Sundheim, Covell & Tummino LLP

(57) ABSTRACT

A subassembly (10) includes an inflator (12) for a vehicle safety system having a cylindrical outer wall (14), at least one bolt (16) fastened to the outer wall (14) in a substance-to-substance or form-fit manner, for mounting the inflator (12) on a component and a saddle element (18) attached to the bolt. The saddle element (18) includes a supporting portion (24) that bears on the outer wall (14) of the inflator (12).

15 Claims, 4 Drawing Sheets

(56) References Cited

FOREIGN PATENT DOCUMENTS

| | | |
|---|---|---|
| DE | 10 2010 052 781 | 5/2012 |
| JP | 2000 85515 | 3/2000 |
| JP | 2004 291887 | 10/2004 |
| WO | 2012/072152 | 6/2012 |

* cited by examiner

INFLATOR FASTENING

BACKGROUND OF THE INVENTION

The invention relates to a subassembly comprising an inflator for a vehicle safety system having a cylindrical outer wall as well as at least one bolt fastened to the outer wall in a substance-to-substance or form-fit manner so as to mount the inflator on a component.

Tubular inflators, as they are used, for example, in passenger airbag modules or in seat-integrated side airbag modules, are usually mounted through threaded bolts radially projecting from the housing shell. It is known, for instance, from the generic DE 20 2004 017 428 U1 to make use of bolts having a small flange at one end which is fastened to the inflator housing by capacitor discharge welding. With the aid of the threaded bolts the inflator is mounted, usually together with the airbag, on the module housing or on a body element.

In the case of activation of the airbag module very high forces can be transmitted to the bolts, more exactly speaking to the connecting points between the bolts and the inflator housing, by deployment of the airbag, the main load being oriented normal to the bolt axes. Providing a robust housing wall to prevent the welded bolts from tear-off contradicts the tendency, however, to design modern inflator housings to have very thin walls so as to save weight and material. There have already been developed solutions according to which thin-walled inflators are mounted to fixed parts by means of clamps, as shown e.g. in U.S. Pat. No. 4,153,273, or by means of through-bolts. Such fastening systems are relatively expensive, however. The same is applicable to the use of massive parts to stabilize the connecting point between the bolts and the inflator housing.

SUMMARY OF THE INVENTION

It is the object of the invention to optimize the fastening of a tubular inflator, especially in the case of activation of the airbag module by relieving the bolts which serve for fastening the inflator.

This object is achieved by a subassembly comprising the features of claim 1. Advantageous and expedient configurations of the subassembly according to the invention are described in the subclaims.

The subassembly according to the invention comprises an inflator for a vehicle safety system having a cylindrical outer wall as well as at least one bolt fastened to the outer wall in a substance-to-substance or form-fit manner for mounting the inflator on a component part. According to the invention, a saddle element is attached to the bolt, wherein the saddle element includes a supporting portion bearing on the outer wall of the inflator.

The invention is based on the finding that the load of the connecting point between the bolt and the outer wall of the inflator housing can be definitely reduced when the forces acting on the bolt normal to the longitudinal axis thereof are extensively introduced into the housing of the inflator. For this, the saddle element attached to the bolt is provided according to the invention. The use of the saddle element permits to employ a tubular inflator having a comparatively thin outer wall to which a bolt is fastened, especially welded. Another advantage of the saddle element according to the invention results from mounting the inflator. Depending on the concrete design of the saddle element, when screw-fastening the inflator, for example to a body part of the vehicle, with a nut matching the bolt end, the tightening force can be introduced partly or even completely into the inflator housing via a flange of the bolt adjacent to the outer wall of the inflator. In this way, the welded connection and the transition area of the bolt to the thin-walled inflator housing are loaded less or not at all, when the nut is tightened. Moreover, it is advantageous that the saddle element is fastened exclusively to the bolt and need not additionally be fastened or welded to further components, such as for example the outer wall of the inflator. Hence the supporting portion of the saddle element is not fixed to the inflator by welding, but it is movable relative to the outer wall of the inflator.

Preferably the supporting portion bears on the outer wall of the inflator in a resilient fashion, in particular in a pre-stressed state. Thus, in the case of activation of the inflator, the afore-described introduction of force can directly take place. In addition, possible rattling noise can be avoided which might occur due to vibrations during operation of the vehicle by excessive play between the supporting portion and the outer wall of the inflator.

Preferably a fixing portion having an opening for passage of the bolt is provided, with the fixing portion being preferably even so that an optimum introduction of force is ensured during tightening.

Preferably the fixing portion bears on a flange portion of the bolt adjacent to the outer wall of the inflator, whereas the supporting portion of the saddle element is supported on the outer wall of the inflator. In this configuration of the saddle element the fixing portion spaced from the outer wall of the inflator housing provides, apart from the positioning of the saddle element, for direct introduction of force of the tightening force when screwing the inflator, while the supporting portion primarily serves for an extensive introduction of force into the inflator housing in the case of activation of the inflator.

For safely fixing the saddle element at the bolt contrary to the attaching direction of the saddle element, in a preferred embodiment of the saddle element according to the invention at least one preferably resilient clamping portion acting on the bolt is provided at the edge of the opening. The clamping effect achieved in this way counteracts an undesired displacement of the saddle element on the bolt.

This securing mechanism is especially effective when the bolt includes a male thread and the clamping portion engages in the thread. Then the clamping portion can "grab into" the thread of the bolt in the attaching area.

A preferred possibility of designing the supporting portion is to bend the latter starting from the fixing portion by at least 180°, preferably by 225°, furthermore preferably by 360°.

Alternatively, the supporting portion can also be bent by less than 90°, again starting from the fixing portion.

According to a further preferred configuration the fixing portion is substantially ring-shaped.

Especially for the case that an anti-twist protection for the saddle element is desired, an embodiment is recommended in which the supporting portion is adapted to the curvature of the outer wall of the inflator. When the supporting portion contacts the outer wall, it cannot be twisted about the bolt axis any more. Furthermore, adapting the supporting portion to the curvature of the outer wall permits a space-saving configuration of the saddle element.

A particular embodiment of the saddle element is not formed by bending a full-surface basic body (sheet steel or the like). Rather, according to an alternative design concept, the saddle element is a massive part having flat fixing portion and a supporting portion adapted to the curvature of the outer wall of the inflator.

Further features and advantages of the invention are resulting from the following description and from the enclosed figures which are referred to. They show in:

DESCRIPTION OF EMBODIMENT

Figure 1:
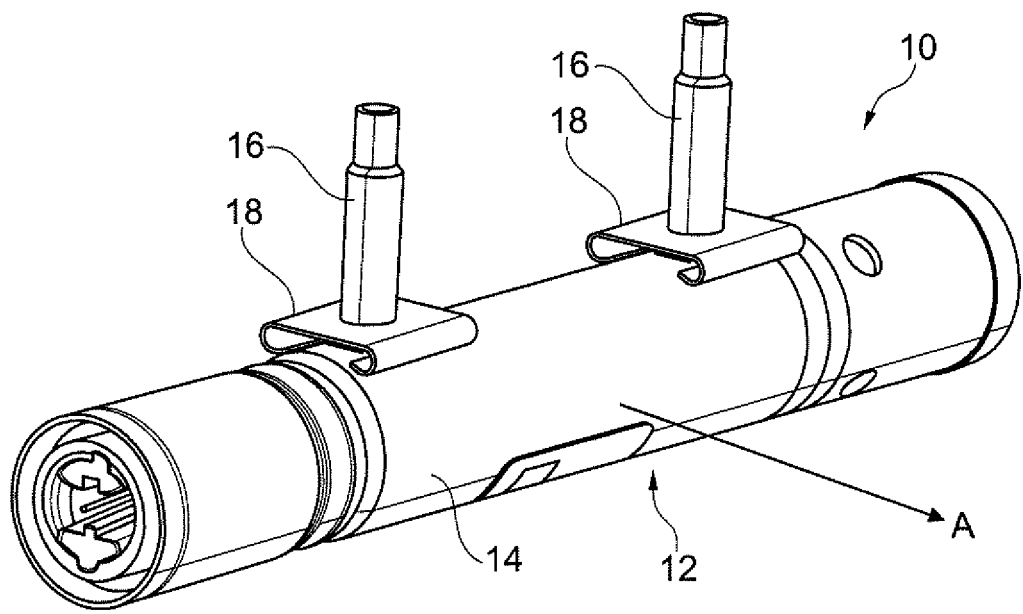
FIG. 1 a subassembly according to the invention in a perspective view.

In FIG. 1 a subassembly 10 is shown comprising an inflator 12, in this case an elongate cylindrical tubular inflator, and plural bolts 16 welded to the cylindrical outer wall 14 of the inflator 12. The bolts 16 preferably provided with a male thread extend with respect to the longitudinal axis of the inflator 12 radially from the outer wall 14. The outer wall 14 of the inflator 12 is relatively thin; its thickness preferably is less than 2 mm.

Moreover in FIG. 1 a direction A is stated in which in the case of activation of the inflator a main force load is active. The direction A is substantially perpendicular to the longitudinal axes of the bolts 16. Such force load can be caused, as described in the beginning, by a very rapid deployment of the airbag.

The subassembly 10 further includes saddle elements 18 attached to the bolts 16. Each saddle element 18 includes a fixing portion 20 having a through-opening 22 adjusted to the diameter of the bolts 16 as well as a supporting portion 24 connected to the fixing portion 20 by which the saddle element 18 is supported on the curved outer wall 14 of the inflator 12.

Figure 2:
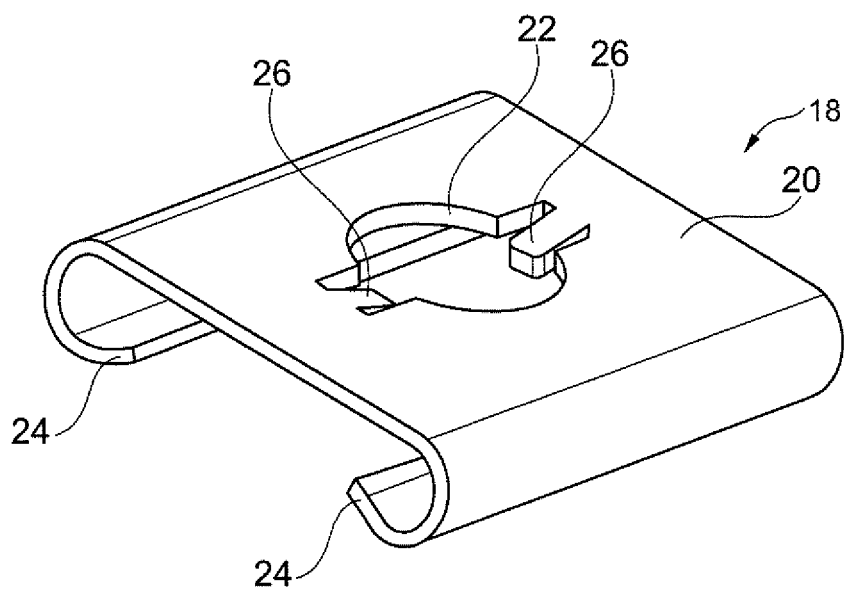
FIG. 2 the saddle element of the subassembly of FIG. 1 in a perspective view.

As is evident especially from FIG. 2, which in detail shows such saddle element 18 according to a first embodiment, the fixing portion 20 is formed to be flat in this case. At the edge of the opening 22 resilient clamping portions 26 are provided which are pre-bent in the direction of the inflator 12. The clamping portions 26 can be elastically deflected at least in the axial direction of the bolts 16. The supporting portion 24 is formed by folding opposite edges of the saddle element 18 by slightly more than 180°.

Figure 3:
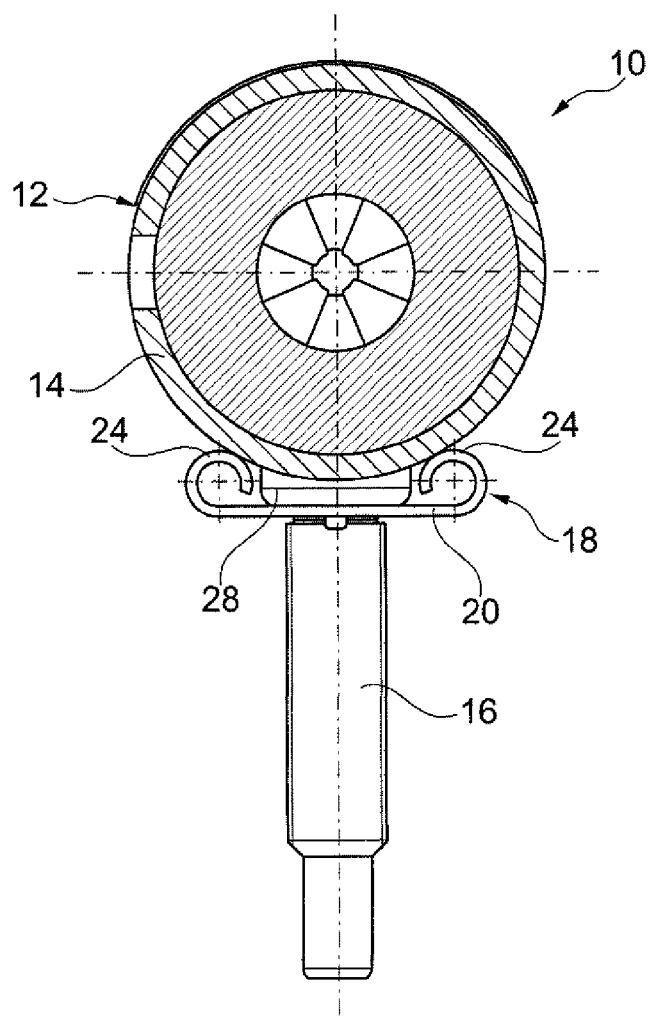
FIG. 3 a cross-sectional view of the subassembly of FIG. 1 in the area of the saddle element.

FIG. 3 shows in which way the saddle element 18 attached to the bolt 16 rests on the inflator 12. While the supporting portion 24 directly bears on the curved outer wall 14, the fixing portion 20 is supported on a flat flange portion 28 of the bolt 16 welded to the outer wall 14 of the inflator 12. In the attached state of the saddle element 18, the clamping portions 26 are engaged in the thread of the bolt 16. In this way, the saddle element 18 is fixed and is secured against being removed in the axial direction of the bolt 16.

The saddle element 18 ensures that, in the case of activating the inflator, the load forces are extensively introduced into the housing of the inflator 12 so that the connecting points of the bolts 16 are loaded to a lesser extent.

Figure 4:
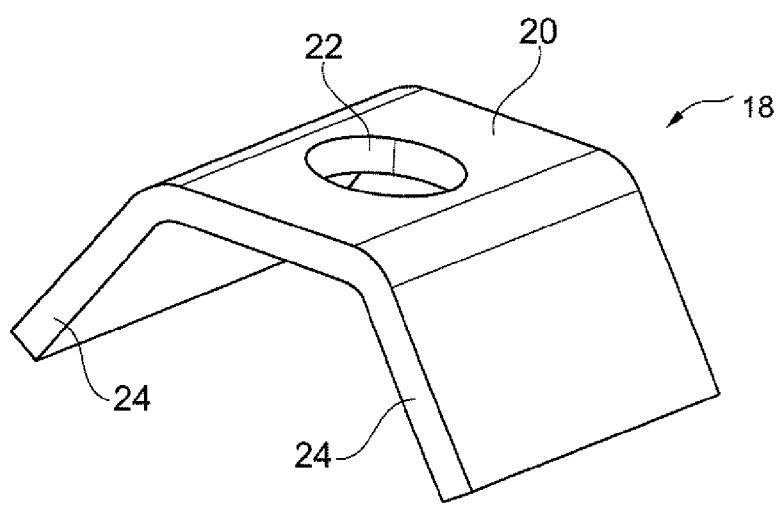
FIGS. 4 through 6 alternative embodiments of the saddle element in respective perspective views.
Figure 5:
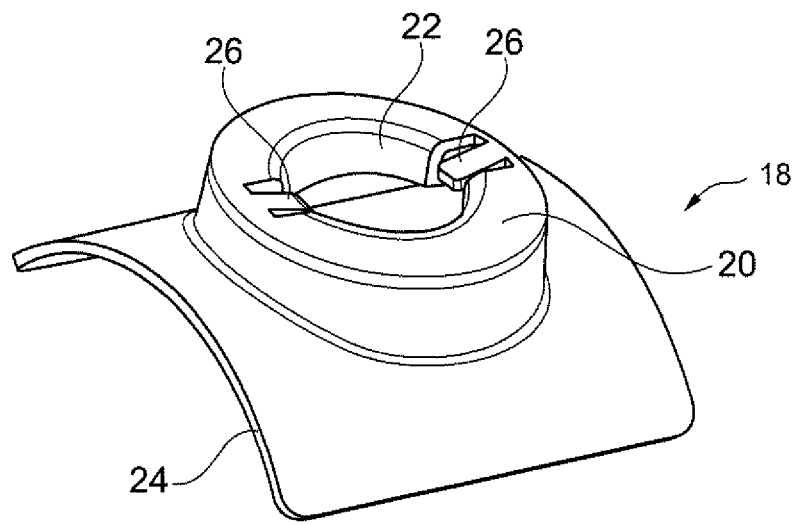
Figure 6:
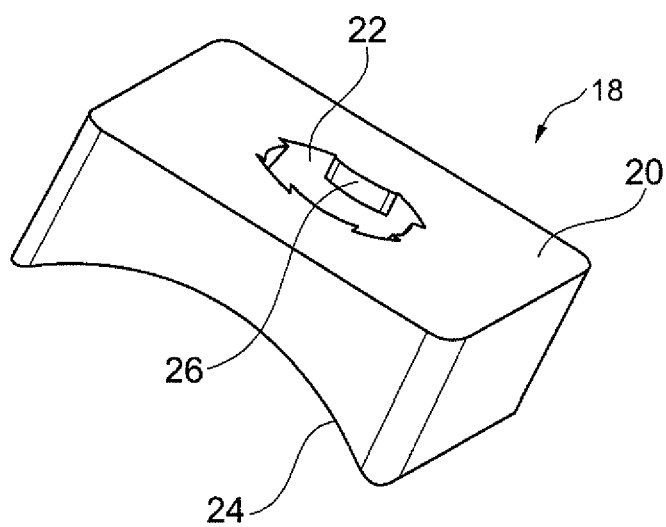

In the FIGS. 4 to 6 alternative embodiments of the saddle element 18 are shown, wherein the same reference numerals as in the first embodiment have been employed.

According to FIG. 4, the supporting portion 24 is bent by less than 90°. In the embodiment of FIG. 5, the fixing portion 20 is substantially ring-shaped, while the supporting portion 24 is adapted to the curvature of the outer wall 14 of the inflator 12. In the embodiment of FIG. 6, the saddle element 18 is a massive component having a flat fixing portion 20 and a supporting portion 24 adapted to the curvature of the outer wall 14 of the inflator 12. In this case the clamping portions 26 are designed differently from the embodiments of the FIGS. 2 and 5.

As a matter of course, particular features of the individual embodiments can be combined with each other.

The saddle elements 18 can be manufactured of sheet steel. Also aluminum pressings, parts milled of steel or plastic parts are basically possible.

Figure 7:
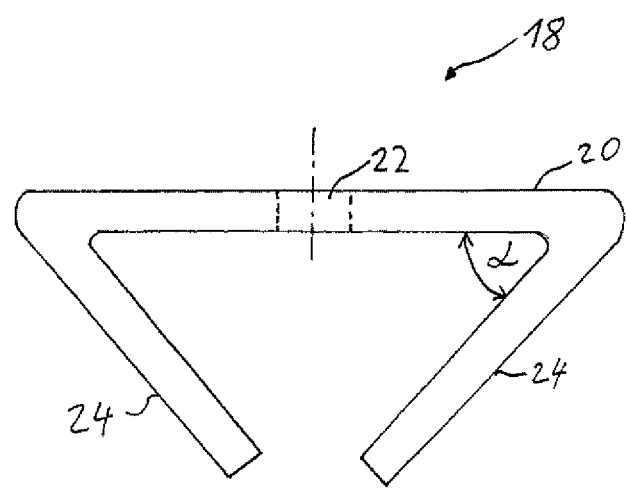
FIG. 7 an alternative embodiment of the saddle element in a side view.

The saddle element 18 shown in FIG. 7 is structured substantially just as the saddle element shown in FIG. 4, with the difference that the supporting portion 24 is bent by more than 90° starting from the fixing portion 20. In this case the supporting portion 4 and the fixing portion 20 enclose an acute angle alpha ($\alpha$) substantially amounting to 45°.

The saddle elements 18 are applied in all inflators which are fastened with the aid of bolts.

LIST OF REFERENCE NUMERALS

10 Subassembly
12 inflator
14 outer wall
16 bolt
18 saddle element
20 fixing portion
22 opening
24 supporting portion
26 clamping portions
28 flange portion

The invention claimed is:

1. A subassembly (10) comprising:
an inflator (12) for a vehicle safety system including a cylindrical outer wall (14),
at least one bolt (16) fastened directly to the outer wall (14) in a substance-to-substance or form-fit manner for mounting the inflator (12) on a component, and
a saddle element (18) attached to the bolt (16) and including a supporting portion (24) that bears on the outer wall (14) of the inflator (12).

2. The subassembly according to claim 1, wherein the supporting portion (24) bears on the outer wall (14) of the inflator (12) resiliently in a pre-stressed state.

3. The subassembly according to claim 1, wherein the saddle element (18) includes a flat fixing portion (20) having an opening (22) through which the bolt (16) passes.

4. The subassembly according to claim 3, wherein the fixing portion (20) bears on a flange portion (28) of the bolt (16) adjacent to the outer wall (14) of the inflator (12).

5. A subassembly (10) comprising:
an inflator (12) for a vehicle safety system including a cylindrical outer wall (14),
at least one bolt (16) fastened to the outer wall (14) in a substance-to-substance or form-fit manner for mounting the inflator (12) on a component, and
a saddle element (18) attached to the bolt (16) and including a supporting portion (24) that bears on the outer wall (14) of the inflator (12), a flat fixing portion (20) of the saddle element (18) including an opening (22) through which the bolt (16) passes,
wherein at an edge of the opening (22) at least one resilient clamping portion (26) acts on the bolt (16) for fixing the saddle element (18) at the bolt (16) contrary to the attaching direction of the saddle element (18).

6. The subassembly according to claim 5, wherein the bolt (16) includes a male thread and the clamping portion (26) engages in the male thread.

7. A subassembly (10) comprising:
- an inflator (12) for a vehicle safety system including a cylindrical outer wall (14),
- at least one bolt (16) fastened to the outer wall (14) in a substance-to-substance or form-fit manner for mounting the inflator (12) on a component, and
- a saddle element (18) attached to the bolt (16) and including a supporting portion (24) that bears on the outer wall (14) of the inflator (12), a flat fixing portion (20) of the saddle element (18) including an opening (22) through which the bolt (16) passes,
- wherein the supporting portion (24) is bent starting from the fixing portion (20) by at least 180°.

8. The subassembly according to claim 3, wherein the fixing portion (20) is substantially ring-shaped.

9. The subassembly according to claim 1, wherein the supporting portion (24) is adapted to the curvature of the outer wall (14) of the inflator (12).

10. The subassembly according to claim 3, wherein the saddle element (18) is a massive part having a flat fixing portion (20) and a supporting portion (24) adapted to the curvature of the outer wall (14) of the inflator (12).

11. The subassembly according to claim 1, wherein the saddle element (18) is free of connection with the inflator (12).

12. The subassembly according to claim 1, wherein the bolt (16) is fastened directly to the outer wall (14) by a weld.

13. The subassembly according to claim 7, wherein the supporting portion (24) is bent starting from the fixing portion (20) by 225°.

14. The subassembly according to claim 7, wherein the supporting portion (24) is bent starting from the fixing portion (20) by 360°.

15. A subassembly (10) comprising:
- an inflator (12) for a vehicle safety system including a cylindrical outer wall (14),
- at least one bolt (16) fastened to the outer wall (14) in a substance-to-substance or form-fit manner for mounting the inflator (12) on a component, and
- a saddle element (18) attached to the bolt (16) and including a supporting portion (24) that bears on the outer wall (14) of the inflator (12), a flat fixing portion (20) of the saddle element (18) including an opening (22) through which the bolt (16) passes,
- wherein the supporting portion (24) is bent starting from the fixing portion (20) by less than 90°.

* * * * *